United States Patent
Malecki et al.

(10) Patent No.: US 11,970,974 B2
(45) Date of Patent: Apr. 30, 2024

(54) GAS TURBINE ENGINE MOUNTED ABOVE WING AND WITH CAMBER

(71) Applicant: Raytheon Technologies Corporation, Farmington, CT (US)

(72) Inventors: Robert E. Malecki, Storrs, CT (US); Andrew Hahn, Yorktown, VA (US); Marc J. Muldoon, Marlborough, CT (US); Jesse M. Chandler, South Windsor, CT (US); Joseph B. Staubach, Colchester, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 17/570,764

(22) Filed: Jan. 7, 2022

(65) Prior Publication Data

US 2022/0136441 A1 May 5, 2022

Related U.S. Application Data

(63) Continuation of application No. 17/085,184, filed on Oct. 30, 2020.

(51) Int. Cl.
*F02C 7/20* (2006.01)
*B64C 7/02* (2006.01)
(Continued)

(52) U.S. Cl.
CPC ............... *F02C 7/20* (2013.01); *B64C 7/02* (2013.01); *B64D 27/12* (2013.01); *B64D 29/06* (2013.01);
(Continued)

(58) Field of Classification Search
CPC .... F02C 7/20; B64C 7/02; B64C 3/10; B64D 27/12; B64D 27/18; B64D 27/26;
(Continued)

(56) References Cited

U.S. PATENT DOCUMENTS

| 3,727,862 A | 4/1973 | Kaufhold et al. |
| 3,874,620 A | 4/1975 | Kahler et al. |

(Continued)

FOREIGN PATENT DOCUMENTS

| EP | 2204568 A2 | 7/2010 |
| EP | 3597542 A1 | 1/2020 |

(Continued)

OTHER PUBLICATIONS

Nathaniel J. Blaesser, Joseph A. Schetz and Rakesh K. Kapania, "Interference Drag Associated with Engine Locations for Multidisciplinary Design Optimization," AIAA Scitech 2019 Forum (Year: 2019).*

(Continued)

*Primary Examiner* — David P. Olynick
(74) *Attorney, Agent, or Firm* — Carlson, Gaskey & Olds, P.C.

(57) ABSTRACT

A gas turbine engine and engine mount structure includes a core engine including a compressor section, a combustor section and a turbine section mounted within a core engine housing. The fan, the compressor section and the turbine section rotate about an axis of rotation. An outer nacelle surrounds the fan, and is spaced from the core engine housing to define a bypass duct. The fan delivers air into the bypass duct and into the core engine housing. The nacelle is formed with camber so as to be curved in a first plane away from the axis of rotation in a first lateral direction. An engine mount structure extends from the nacelle at an angle that is non-parallel and non-perpendicular to the first plane, and has a component in a lateral direction that is opposed to the first lateral direction. An aircraft is also disclosed.

12 Claims, 7 Drawing Sheets

(51) Int. Cl.
  *B64D 27/12* (2006.01)
  *B64D 29/06* (2006.01)
  *B64D 29/08* (2006.01)
  *F02C 7/06* (2006.01)
  *F02C 7/14* (2006.01)
  *F02C 7/32* (2006.01)

(52) U.S. Cl.
  CPC ........... *B64D 29/08* (2013.01); *F02C 7/06* (2013.01); *F02C 7/14* (2013.01); *F02C 7/32* (2013.01); *F05D 2220/323* (2013.01); *F05D 2230/72* (2013.01); *F05D 2260/213* (2013.01); *F05D 2260/4031* (2013.01); *F05D 2260/98* (2013.01)

(58) Field of Classification Search
  CPC ........ B64D 29/02; B64D 29/06; B64D 29/08; B64D 2027/262; F05D 2230/72; F05D 2230/80
  See application file for complete search history.

(56) References Cited

U.S. PATENT DOCUMENTS

| | | | |
|---|---|---|---|
| 3,971,534 | A | 7/1976 | Grotz |
| 4,044,973 | A | 8/1977 | Moorehead |
| 4,449,681 | A * | 5/1984 | Gratzer ............... B64D 29/02 244/54 |
| 4,801,058 | A | 1/1989 | Mullins |
| 7,883,052 | B2 | 2/2011 | Hahn et al. |
| 7,900,868 | B2 | 3/2011 | Sankrithi et al. |
| 8,016,227 | B2 | 9/2011 | Hammer |
| 8,740,139 | B1 | 6/2014 | Dunavan |
| 11,408,306 | B2 | 8/2022 | Tejero Embuena et al. |
| 2003/0102405 | A1 | 6/2003 | McEvoy |
| 2004/0140397 | A1 | 7/2004 | Dun |
| 2006/0248900 | A1 * | 11/2006 | Suciu ............... F02C 7/36 60/802 |
| 2009/0056343 | A1 | 3/2009 | Suciu et al. |
| 2009/0057493 | A1 | 3/2009 | Sankrithi et al. |
| 2009/0127405 | A1 | 5/2009 | Hahn et al. |
| 2010/0242496 | A1 | 9/2010 | Cass et al. |
| 2011/0091317 | A1 | 4/2011 | Regard |
| 2020/0023984 | A1 | 1/2020 | Lim et al. |

FOREIGN PATENT DOCUMENTS

| | | |
|---|---|---|
| GB | 585443 | 2/1947 |
| GB | 2203105 A | 10/1988 |

OTHER PUBLICATIONS

John R. Hooker, Andrew Wick, Cale Zeune, Anthony Agelastos, "Over Wing Nacelle Installations for Improved Energy Efficiency," 31st AIAA Applied Aerodynamics Conference, 2013. (Year: 2013).*

Michimasa Fujino and Yuichi Kawamura, "Wave-Drag Characteristics of an Over-the-Wing Nacelle Business-Jet Configuration," Journal of Aircraft vol. 40, No. 6, Nov.-Dec. 2003. (Year: 2003).*

European Search Report for EP Application No. 21205765.7 dated Mar. 21, 2022.

Hooker, J.R., Wick, A., Zeune, C., Agelastos, A. (2013). Over Wing Nacelle Installations for Improved Energy Efficiency. 31st AIAA Applied Aerodynamics Conference. AIAA 2013-2920. Fluid Dynamics and Co-located Conferences. Jun. 24-27, 2013. San Diego, CA.

Hahn, A.S. (2012). Application of CART3D to Complex Propulsion-Airframe Integration with Vehicle Sketch Pad. American Institute of Aeronautics and Astronautics. AIAA 2012-0547. pp. 1-9.

* cited by examiner

GAS TURBINE ENGINE MOUNTED ABOVE WING AND WITH CAMBER

CROSS-REFERENCE TO RELATED APPLICATIONS

This application is a divisional of U.S. patent application Ser. No. 17/085,184 filed Oct. 30, 2020.

BACKGROUND

This application relates to improvements in gas turbine engines to be mounted above a wing in an aircraft.

Gas turbine engines are known to power aircraft. In a gas turbine engine a fan delivers air into a bypass duct as propulsion air, and also into a compressor. The compressor compresses the air and delivers it into a combustor and is mixed with fuel and ignited. Products of the combustion pass downstream over turbine rotors, driving them to rotate. The turbine rotors in turn drive the fan and compressor rotors.

A core housing surrounds the compressor, combustor and turbine sections. A nacelle is spaced radially outwardly of the core housing and the fan to define the bypass duct.

Historically gas turbine engines have been mounted to the underside of the wings, or to the fuselage of the aircraft. It has also been proposed to mount gas turbine engines above the wing of an aircraft.

SUMMARY

In a featured embodiment, a gas turbine engine and engine mount structure includes a core engine including a compressor section, a combustor section and a turbine section mounted within a core engine housing. The fan, the compressor section and the turbine section rotate about an axis of rotation. An outer nacelle surrounds the fan, and is spaced from the core engine housing to define a bypass duct. The fan delivers air into the bypass duct and into the core engine housing. The nacelle is formed with camber so as to be curved in a first plane away from the axis of rotation in a first lateral direction. An engine mount structure extends from the nacelle at an angle that is non-parallel and non-perpendicular to the first plane, and has a component in a lateral direction that is opposed to the first lateral direction.

In another embodiment according to the previous embodiment, the engine mount structure extends along an angle away from the axis of rotation defined away from the first plane, and the angle is between 30 and 50 degrees.

In another embodiment according to any of the previous embodiments, the nacelle includes D-doors which can be pivoted outwardly away from the core housing to provide access to inside the engine.

In another embodiment according to any of the previous embodiments, at least one of the D-doors has an attachment that provides a support for maintenance workers when the D-doors are in an open position.

In another embodiment according to any of the previous embodiments, a second plane is defined perpendicular to the first plane and also extends through the axis of rotation, and the engine mount structure is on one side of the second plane and an auxiliary gearbox driven by the turbine section is positioned on a second side of the second plane.

In another embodiment according to any of the previous embodiments, an oil tank is also mounted in the opposed side.

In another embodiment according to any of the previous embodiments, a pre-cooler is provided in a side of the second plane from which engine mount structure extends.

In another embodiment according to any of the previous embodiments, wherein the nacelle is formed to be non-perpendicular to the axis of rotation at a trailing edge of the nacelle.

In another embodiment according to any of the previous embodiments, the nacelle is formed to be perpendicular to the axis of rotation at a trailing edge of the nacelle.

In another featured embodiment, an aircraft includes a fuselage and a pair of wings extending laterally outwardly of the fuselage. The wings include a relatively straight portion between the fuselage and a gas turbine engine, and a swept portion laterally outwardly of the gas turbine engine relative to the fuselage. An engine mount structure attaches the gas turbine engine to the relatively straight portion, and vertically above the wings. The gas turbine engine has a core engine including a compressor section, a combustor section and a turbine section mounted within a core engine housing. The fan, the compressor section and the turbine section rotate about an axis of rotation. An outer nacelle surrounds the fan, and is spaced from the core engine housing to define a bypass duct. The fan delivers air into the bypass duct and into the core housing. The nacelle is formed with camber so as to be curved in a first plane defined parallel to the horizontal and away from the axis of rotation in a first lateral direction. The engine mount structure extends from the nacelle at an angle that is non-parallel and non-perpendicular to the first plane, and has a component in a lateral direction that is opposed to the first lateral direction.

In another embodiment according to any of the previous embodiments, a first distance is defined by a first chord of the swept portion of the wings immediately laterally outwardly of the nacelle on each the gas turbine engine. A first distance is defined between a leading edge of the swept portion of the wing and a trailing edge of the nacelle. A ratio of the first distance to the first chord is greater than or equal to 10% and less than or equal to 50%.

In another embodiment according to any of the previous embodiments, a second chord is defined between a leading edge of the straight portion of the wings and a trailing edge of the straight portion of the wings. A second distance is defined between the leading edge of the straight portion of the wings and the trailing edge of the nacelle, and a ratio of the second distance and the second chord is greater than or equal to 5% and less than or equal to 75%.

In another embodiment according to any of the previous embodiments, a second plane is defined perpendicular to the first plane and also extending through the axis of rotation. The engine mount structure is on one side of the second plane and an auxiliary gearbox driven by the turbine section is positioned on a second side of the second plane.

In another embodiment according to any of the previous embodiments, at least one component associated with each the gas turbine engine are mounted within the straight portion of the wings.

In another embodiment according to any of the previous embodiments, a drive shaft is driven by the turbine section of the gas turbine engine and drives at least one the component.

In another embodiment according to any of the previous embodiments, at least component includes at least one of an oil tank and batteries or controllers.

In another embodiment according to any of the previous embodiments, the engine mount structure extends along an angle away from the axis of rotation defined away from the first plane, and the angle is between 30 and 50 degrees.

In another embodiment according to any of the previous embodiments, the nacelle including D-doors which can be pivoted outwardly away from the core housing to provide access to inside the engine.

In another embodiment according to any of the previous embodiments, at least one of the D-doors has an attachment that provides a support for maintenance workers when the D-doors are in an open position.

In another embodiment according to any of the previous embodiments, the nacelle is formed to be non-perpendicular to the axis of rotation at a trailing edge of the nacelle.

These and other features can be best understood from the following specification and drawings, the following which is a brief description.

DETAILED DESCRIPTION

Figure 1A:
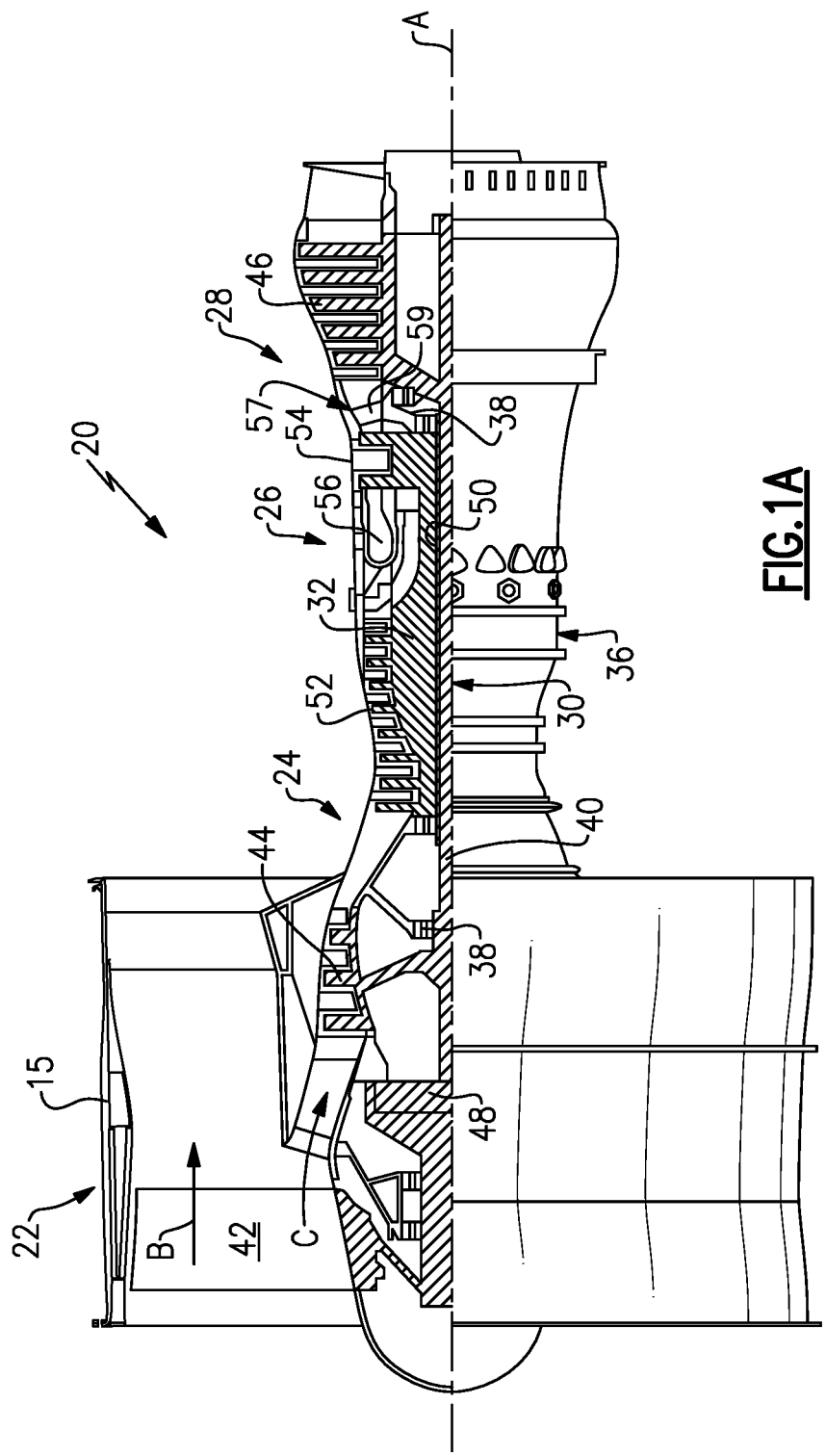
FIG. 1A shows a standard gas turbine engine.

FIG. 1A schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of

[(Tram °R)/(518.7°R)]$^{0.5}$. The "Low corrected fan tip speed" as disclosed herein according to one non-limiting embodiment is less than about 1150 ft/second (350.5 meters/second).

Figure 1B:
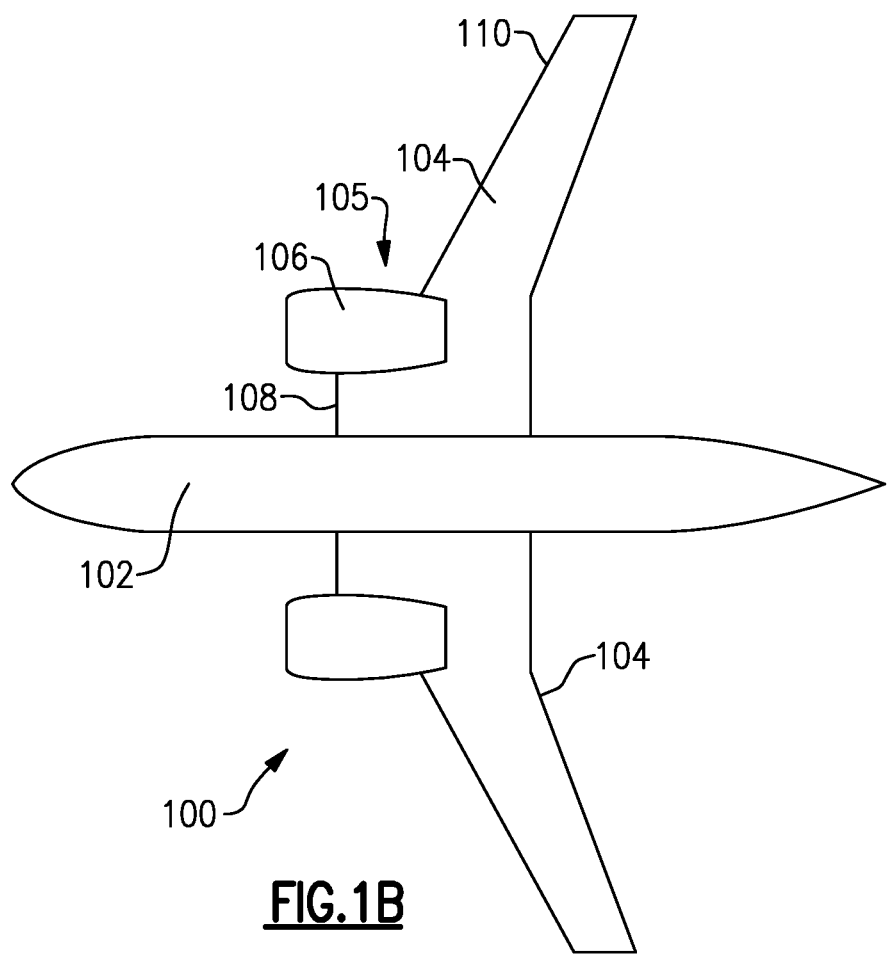
FIG. 1B is a plan view of an aircraft with engines mounted above the wings.

FIG. 1B shows an aircraft 100 having a fuselage 102 and wings 104. Engines 105 are mounted above the wings 104. A nacelle 106 provides the outer surface of the engines 105, as known. The engines 105 may be similar to the engine shown in FIG. 1A, or could be direct drive engines.

The wings 104 include a relatively straight section 108 extending between the fuselage 102 and the nacelle 106 and a swept wing portion 110 which is laterally outward of the engine 105. As is clear, the relatively straight section 108 is closer to being perpendicular to a flight direction of the aircraft 100 compared to the swept wing portion 110.

Figure 1C:
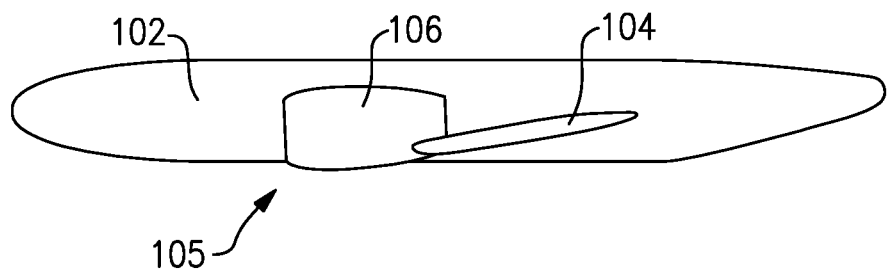
FIG. 1C is a side view of the FIG. 1B engine.

FIG. 1C shows the wings 104, engine 105 and fuselage 102 from the side.

The prior art engines mounted underneath the wing are constrained by ground clearance. Recently gas turbine engines are being provided with higher bypass ratios. However, this typically requires a larger nacelle such that the bypass duct can be larger. The ground clearance constraint limits the amount of increase of the bypass ratio. An over wing mount provides relief from this constraint, and also provides potential fuel burn and noise benefits. Further, there is less drag than an under wing installation.

Figure 2A:
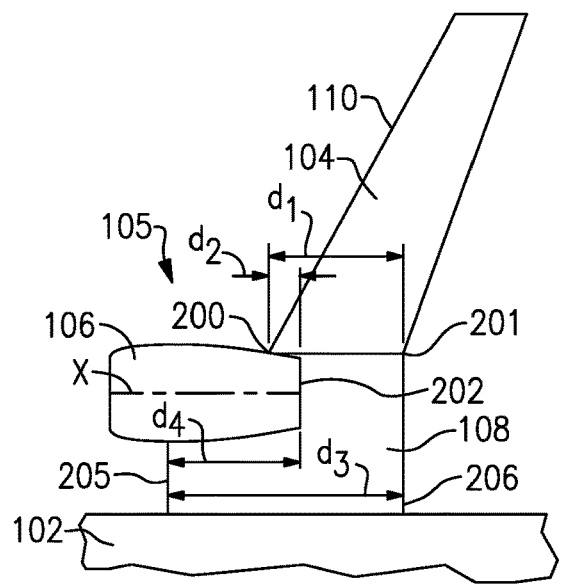
FIG. 2A shows a first feature of a gas turbine engine.

FIG. 2A shows details of the engine 105. The swept wing portion 110 has a chord distance defined parallel to an axis of rotation X of the engine 105 between a leading edge 200 and a trailing edge 201 of the swept wing portion 110. This chord is labeled $d_1$ as is measured at a location where the swept wing portion begins, immediately outward of nacelle 106. A second length $d_2$ is defined between the leading edge 200 and a trailing edge 202 of nacelle 106.

A chord length $d_3$ is defined between a leading edge 205 and a trailing edge 206 of the straight section 108 of the wing 104. A fourth distance $d_4$ is defined between the leading edge 205 of the straight section 108 of the wing and the trailing edge 202 of the nacelle. All of these distances are measured parallel to the axis of rotation of the engine 105.

In an embodiment, a ratio of $d_2$ to $d_1$ is greater than or equal to 10% and less than or equal to 50%, and in embodiments greater than or equal to 10% and less than or equal to 33% and in one embodiment 33%.

A ratio of $d_4$ to $d_3$ is less than or equal to 75% and greater than or equal to 5%, and in embodiments less than or equal to 65% and greater than or equal to 5%, and in other embodiments less than or equal to 50% and greater than or equal to 5%, and in one embodiment 50%.

Figure 2B:
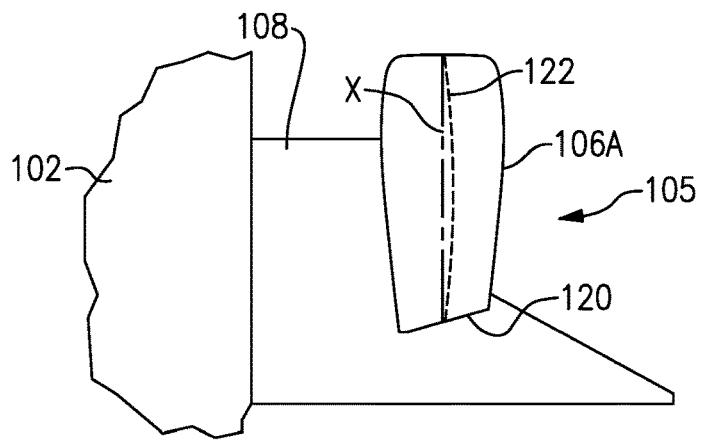
FIG. 2B shows another feature.

FIG. 2B shows an engine 105 having the nacelle 106a. The trailing edge 120 has "scarf" or is at a non-perpendicular angle relative to an axis of rotation X of the engine 105 within the nacelle 106a. Scarf may be found in a view looking downwardly of a nacelle, and from the side. It is essentially a degree of freedom that allows fine tuning of a wing nacelle exhaust interaction. Essentially, it allows fine tuning of the inboard nacelle wall linked to interact with the inboard part of the wing independently of the outboard nacelle wall interaction with the outboard wing. It also provides control of an exhaust plume with regard to both inboard and outboard wing flow fields. The nacelle 106a is provided with camber 122. Essentially camber means that a center point of the nacelle 106a is not formed on a straight line parallel relative to the axis of rotation X of the gas turbine engine 105, in a plane which is parallel to the horizontal, and extending through the axis of rotation X. As can be appreciated, the line of camber 122 extends away from the fuselage 102. While the line of camber 122 is shown as a simple curve in this Figure and in practice it may be much more complex. In one example the line of camber may be similar to those of super critical airfoils.

Figure 2C:
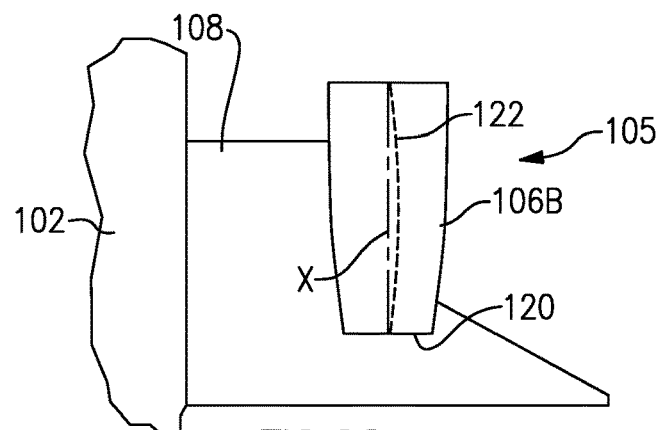
FIG. 2C is similar to FIG. 2B but showing a distinct embodiment.

FIG. 2C shows a nacelle 106b also having camber 122. Nacelle 106b does not have scarf, or zero scarf, but rather has its trailing edge 120 being perpendicular to the axis of rotation X.

The camber shape improves wing leading edge suction through the rapid acceleration of the airflow, terminating in a shock wave in the forward portion of the wing. A symmetric nacelle would create a shock system that reduces lift and drag benefits of leading edge suction on both the straight section 108 and swept section 110. Cambering the nacelle 106 tailors the shock structure on the wing, making the net effect beneficial.

Nacelle camber enables a beneficial drag reduction in a transonic speed regime. This provides benefits to an over wing mount of an engine.

Figure 3A:
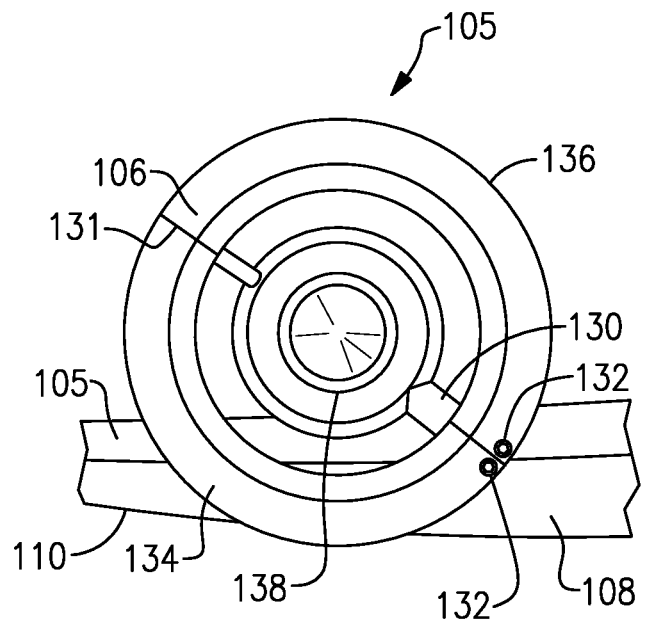
FIG. 3A shows yet another feature.

FIG. 3A shows an engine 105 having an engine mount structure 130 for mounting to the straight wing portion 108. A core engine 138 is shown within the nacelle 106. The nacelle 106 is shown to have a separation line 131 and pivot axes 132. It should be understood that the forward most portion of the nacelle 106 would not necessarily have the separation line 131, and one might not be able to see the pivot axes 132. However, the view of FIG. 3 is shown to illustrate D-doors 134 and 136. The pivot axes 132 are associated with engine mount structure 130.

Figure 3B:
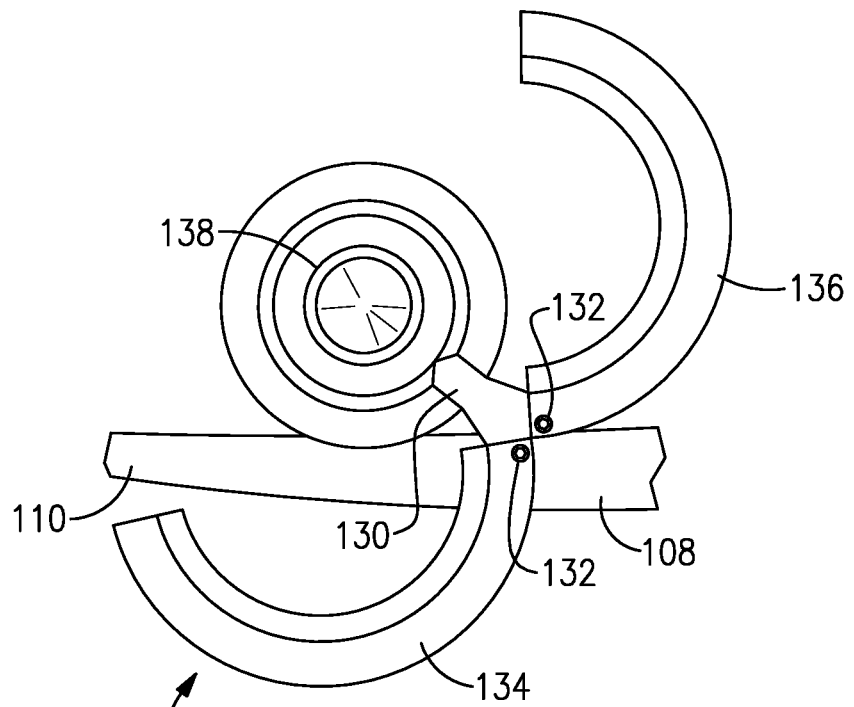
FIG. 3B shows the FIG. 3A and the engine in a maintenance position.

As shown in FIG. 3B, since the engine mount structure 130 is at an angle which is non-vertical, so that when the D-doors 134 and 136 are open there will be easier access to the interior of the engine, than if the engine mount structure extended vertically.

Figure 3D:
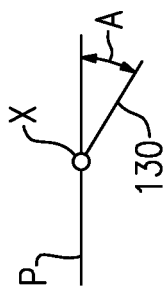
FIG. 3D shows features of the engine.
Figure 3E:
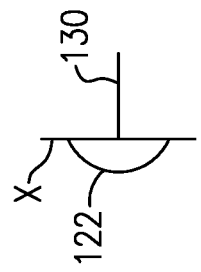
FIG. 3E shows yet another feature.
Figure 3C:
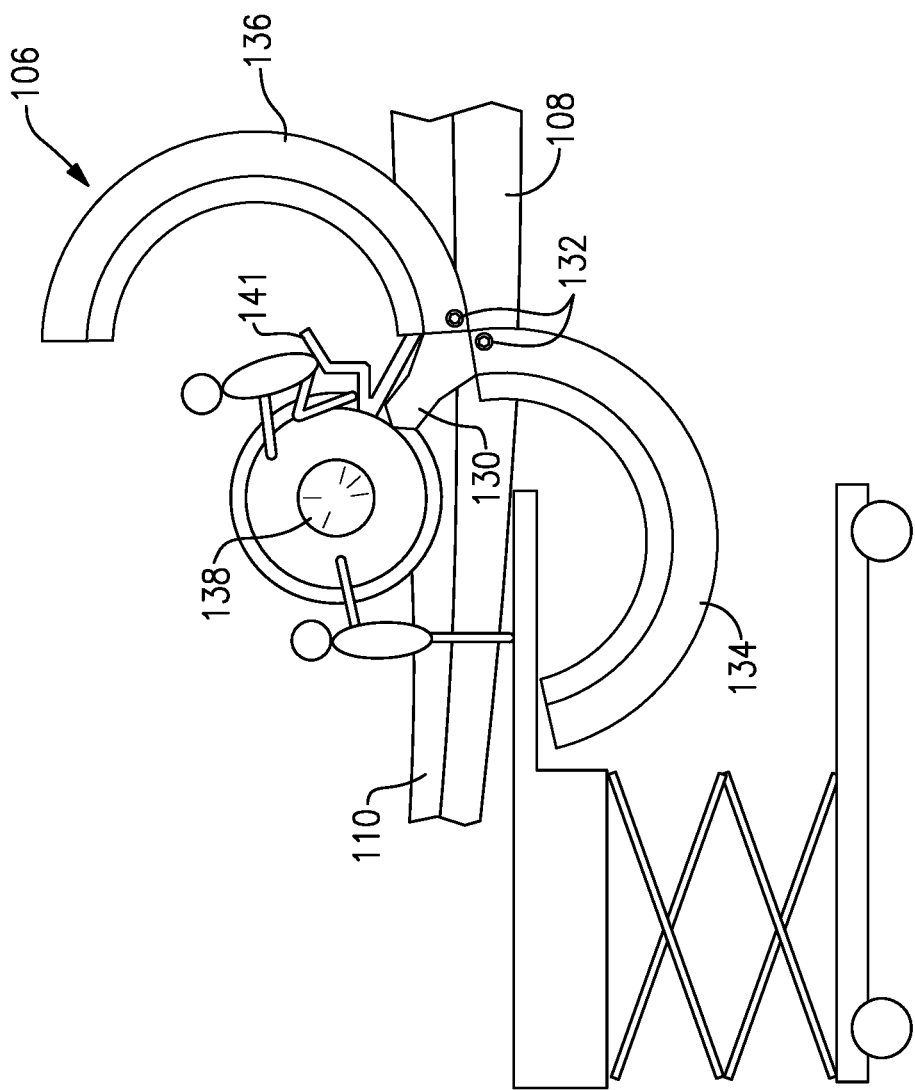
FIG. 3C shows maintenance work.

This is illustrated in FIG. 3C where maintenance work is occurring to the engine 138. Notably, a maintenance support attachment 141 is provided that may function as a step or seat for a maintenance worker.

In an engine mounted beneath the wing, the engine mount structure would typically extend vertically to connect the engine to the wing. The D-doors can pivot to open upwardly, allowing maintenance access from underneath the wing. However, applicant has recognized an engine mounted through a vertically extending engine mount structure above the wing would have the D-doors open in a way where one could not gain access to the engine.

In addition, the angled engine mount structure reduces engine mount structure weight, and reduces the structure required to connect the engine to the wing.

FIG. 3D schematically shows a feature of the engine mount structure 130 relative to the axis of rotation X of the core engine 138. A first plane P could be defined which extends through the axis of rotation X. This plane P would be parallel to the horizontal when the engine is mounted on an aircraft.

The engine mount structure 130 extends vertically downwardly from the plane P and laterally outwardly of the axis of rotation X, and defines an angle A relative to the first plane P. Angle A may be in a range of 30 to 50 degrees. That is, the angle A could be said to be non-parallel and non-perpendicular to the plane P.

FIG. 3E shows that relative to the axis of rotation X, the line of camber 122 is curved laterally away in an opposed direction to the lateral extension direction of the engine mount structure 130.

Figure 4:
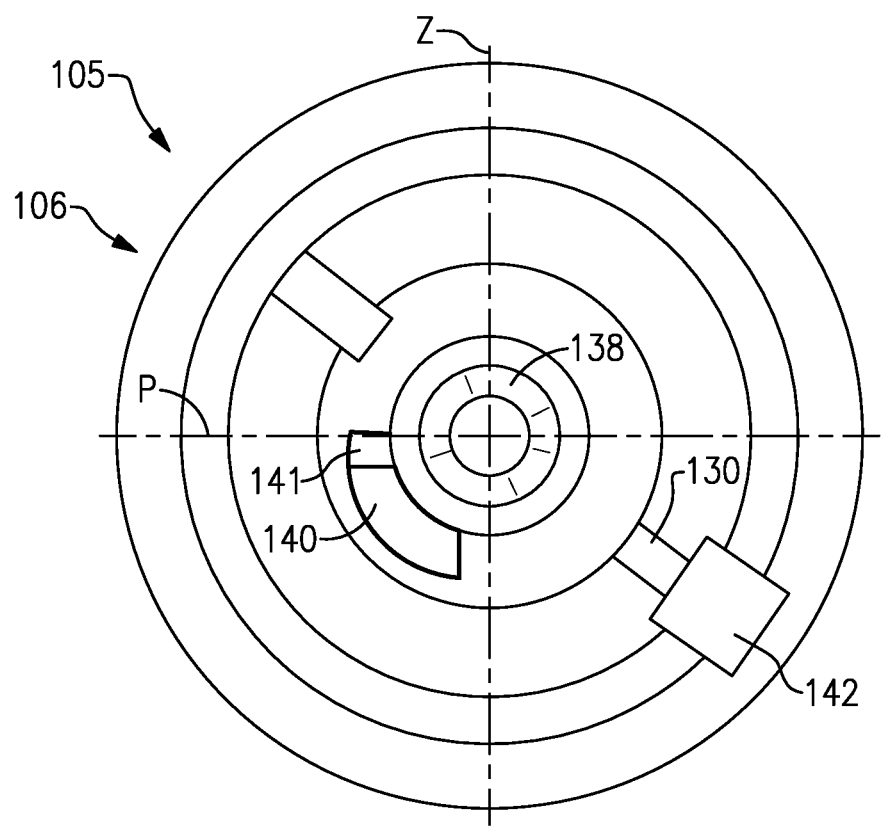
FIG. 4 illustrates other details.

FIG. 4 shows repositioning modifications because of the angled mount of the engine mount structure 130. An auxiliary gearbox 140 is shown on an opposed side of a second plane Z from engine mount structure 130. The plane Z is perpendicular to the first plane P. Historically, the auxiliary gear box would be mounted at bottom dead center, or bisected by plane Z. However, the engine mount structure 130 might interfere with this location. As such, as shown, the location of the auxiliary gearbox 140 is rotated to be in an opposed side of the plane Z from the location of the engine mount structure 130. Similarly, the oil tank 141 may also be relocated to that side. A precooler 142 may be positioned on the same side of the plane Z as the engine mount structure 130. The oil tank 141 and gearbox 140 often require maintenance, and thus would not be in the position of the precooler 142. In the illustrated position, the oil tank 141 and gearbox 140 would be accessible. However, precooler 142 typically sees less maintenance, and thus can be in this position.

Figure 5:
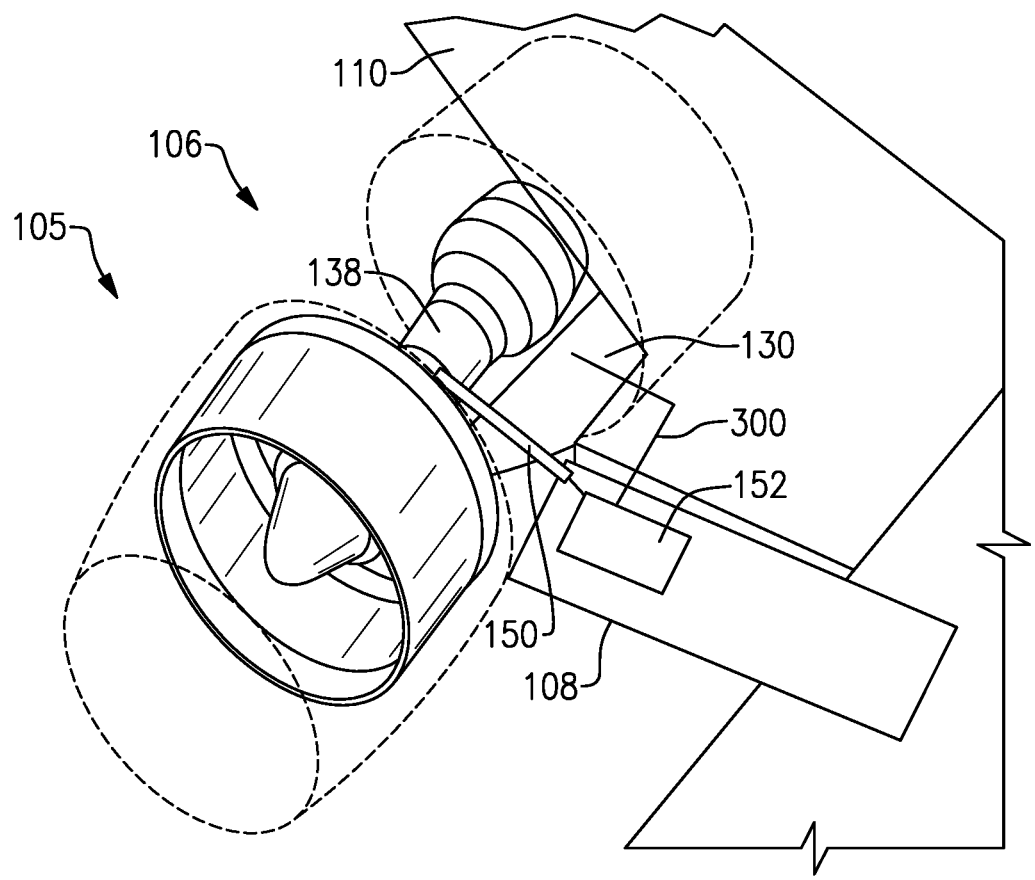
FIG. 5 illustrates further details.

FIG. 5 shows yet another feature of an over wing mount, and includes utilizing the straight wing section 108 for positioning engine components. A power take-off 150 extends from the core engine 138 of the engine 105. Shaft may drive a component 152 within the forward space of the straight wing portion 108. Component 152 may include larger generators and motors mounted here to use the extra space. Further, fluid lines 300 are shown schematically, and may communicate back to the engine 105. Further, this space can be utilized for an oil tank, hybrid electric batteries and/or controllers.

The angled engine mount structure further facilitates the placement of these components in the straight wing portion 108. This is true because oil and electric lines must be routed from the core of the engine to the motors and/or tanks, and this would typically be done by routing the lines through a nacelle bifurcation. With a vertical engine mount structure this would require them to be routed down and then over, resulting in longer and more complex connection than with the angled engine mount structure.

A gas turbine engine and engine mount structure could be said to include a core engine housing including a compressor section, a combustor section and a turbine section, a fan. The fan, the compressor section and the turbine section rotate about an axis of rotation. An outer nacelle surrounds the fan, and is spaced from the core engine housing to define a bypass duct. The fan delivers air into the bypass duct and into the core engine housing. The nacelle is formed with camber so as to be curved in a first plane away from the axis of rotation in a first lateral direction, and an engine mount structure extending from the nacelle at an angle that is non-parallel and non-perpendicular to the first plane, and having a component in a lateral direction that is opposed to the first lateral direction An aircraft could be said to include a fuselage and a pair of wings extending laterally outwardly of the fuselage. The wings include a relatively straight portion between the fuselage and a gas turbine engine, and a swept portion laterally outwardly of said gas turbine engine relative to said fuselage. An engine mount structure attaches the gas turbine engine to the straight portion, and vertically above the wings. The gas turbine has a core engine housing including a compressor section, a combustor section and a turbine section, a fan. The fan, the compressor section and the turbine section rotate about an axis of rotation. An outer nacelle surrounds the fan, and is spaced from the core engine housing to define a bypass duct. The fan delivers air into the bypass duct and into the core housing. The nacelle is formed with camber so as to be curved in a first plane defined parallel to the horizontal and extending through the axis of rotation away from the axis of rotation in a first lateral direction. The engine mount structure extends from the nacelle at an angle that is non-parallel and non-perpendicular to the first plane, and having a component in a lateral direction that is opposed to the first lateral direction.

An embodiment of this disclosure has been described. However, a worker of ordinary skill in this art would recognize that modification would come within the scope of this disclosure. For that reason the following claims should be studied to determine the true scope and content.

What is claimed is:

1. An aircraft comprising: a fuselage and a pair of wings extending laterally outwardly of said fuselage, said wings including a relatively straight portion between said fuselage and a gas turbine engine, and a swept portion laterally outwardly of said gas turbine engine relative to said fuselage, the relatively straight portion is closer to being perpendicular to a fuselage centerline of the aircraft compared to the swept portion; an engine mount structure attaching said gas turbine engine to said relatively straight portion, and vertically above said wings, said gas turbine engine having a core engine including a compressor section, a combustor section and a turbine section mounted within a core engine housing; a fan, said fan, said compressor section and said turbine section rotating about an axis of rotation; an outer nacelle surrounding said fan, and being spaced from said core engine housing to define a bypass duct, said fan delivering air into said bypass duct and into said core engine housing; said nacelle being formed with camber so as to be curved in a first plane defined parallel to the horizontal and away from said axis of rotation in a first lateral direction, and said engine mount structure extending from said nacelle at an angle that is non-parallel and non-perpendicular to said first plane, and having a component in a lateral direction that is opposed to said first lateral direction; and a shape of the nacelle and its camber improving a wing leading edge suction terminating in a shock wave in a forward inboard portion of the wings, and at the relatively straight section.

2. The aircraft as set forth in claim 1, wherein a first chord distance is defined by a first chord of said swept portion of said wings immediately laterally outwardly of said nacelle on each said gas turbine engine, and a first edge distance is defined between a leading edge of said swept portion of said wing and a trailing edge of said nacelle, and a ratio of said first edge distance to said first chord distance being greater than or equal to 10% and less than or equal to 50%.

3. The aircraft as set forth in claim 2, wherein a second chord is defined between a leading edge of said straight portion of said wings and a trailing edge of said straight portion of said wings and a second distance is defined between said leading edge of said straight portion of said wings and said trailing edge of said nacelle, and a ratio of said second distance and said second chord is greater than or equal to 5% and less than or equal to 75%.

4. The aircraft as set forth in claim 3, wherein a second plane is defined perpendicular to said first plane and also extending through said axis of rotation, and said engine mount structure being on one side of said second plane and an auxiliary gearbox driven by said turbine section is positioned on a second side of said second plane.

5. The aircraft as set forth in claim 1, wherein a second chord is defined between a leading edge of said straight portion of said wings and a trailing edge of said straight portion of said wings and a second distance is defined between said leading edge of said straight portion of said wings and said trailing edge of said nacelle, and a ratio of said second distance and said second chord is greater than or equal to 5% and less than or equal to 75%.

6. The aircraft as set forth in claim 1, wherein at least one component associated with each said gas turbine engine is mounted within said straight portion of said wings.

7. The aircraft as set forth in claim 6, wherein a drive shaft is driven by said turbine section of said gas turbine engine and drives at least said one component.

8. The aircraft as set forth in claim 6, wherein said at least one component includes at least one of an oil tank and batteries or controllers.

9. The aircraft as set forth in claim 1, wherein said engine mount structure extending along an angle away from said axis of rotation defined away from said first plane, and said angle being between 30 and 50 degrees.

10. The aircraft as set forth in claim 1, wherein said nacelle including D-doors which can be pivoted outwardly away from said core housing to provide access to inside said engine.

11. The aircraft as set forth in claim 10, wherein at least one of said D-doors has an attachment that provides a support for maintenance workers when said D-doors are in an open position.

12. The aircraft as set forth in claim 1, wherein said nacelle is formed to be non-perpendicular to said axis of rotation at a trailing edge of said nacelle.

* * * * *